US012454991B2

(12) United States Patent
Deferme (10) Patent No.: US 12,454,991 B2
(45) Date of Patent: Oct. 28, 2025

(54) SPACE SAVING PRESSURE RELIEF VALVES FOR SUSPENSION DAMPERS

(71) Applicant: Advanced Suspension Technology LLC, Northville, MI (US)

(72) Inventor: Stefan Deferme, Heusden-Zolder (BE)

(73) Assignee: Advanced Suspension Technology LLC, Northville, MI (US)

(*) Notice: Subject to any disclaimer, the term of this patent is extended or adjusted under 35 U.S.C. 154(b) by 949 days.

(21) Appl. No.: 17/575,178

(22) Filed: Jan. 13, 2022

(65) Prior Publication Data

US 2023/0220903 A1  Jul. 13, 2023

(51) Int. Cl.
| | | |
|---|---|---|
| *F16F 9/512* | (2006.01) | |
| *B60G 17/08* | (2006.01) | |
| *F16F 9/18* | (2006.01) | |
| *F16F 9/34* | (2006.01) | |
| *F16F 9/43* | (2006.01) | |

(52) U.S. Cl.
CPC ............ *F16F 9/5126* (2013.01); *F16F 9/185* (2013.01); *F16F 9/435* (2013.01)

(58) Field of Classification Search
CPC .......... F16F 9/5126; F16F 9/185; F16F 9/435; F16F 9/3221; F16F 9/466; F16F 9/348; F16F 9/34; F16F 9/16; F16F 9/32; F16F 2222/12; F16F 2230/20; F16F 2230/0023; F16F 2234/02; F16F 2232/08; F16F 2230/30; B60G 13/08; B60G 17/08; B60G 2202/24; B60G 2800/162; B60G 2206/41
See application file for complete search history.

(56) References Cited

U.S. PATENT DOCUMENTS

| | | | |
|---|---|---|---|
| 3,706,362 A | 12/1972 | Faure | |
| 5,163,538 A * | 11/1992 | Derr | .......................... F16F 9/46 |
| | | | 188/282.4 |
| 6,182,805 B1 * | 2/2001 | Kashiwagi | .............. F16F 9/466 |
| | | | 188/266.6 |

(Continued)

FOREIGN PATENT DOCUMENTS

CN          110439952 A       11/2019

OTHER PUBLICATIONS

Extended European Search Report regarding Patent Application No. 23150042.2, dated Jun. 19, 2023.

*Primary Examiner* — Robert A. Siconolfi
*Assistant Examiner* — James K Hsiao
(74) *Attorney, Agent, or Firm* — Harness, Dickey & Pierce, P.L.C.

(57) ABSTRACT

A damper with inner and outer tubes, a piston rod extending between first and second piston rod ends, and a piston mounted to the second piston rod end. The piston is disposed within the pressure tube to define rebound and compression chambers. A fluid transport chamber is positioned between the inner and outer tubes and an intake valve assembly, abutting one end of the pressure tube inside the outer tube, and defines at least one intermediate chamber that is arranged in fluid communication with at least one externally mounted, electro-mechanical control valve. A rebound chamber pressure relief valve, mounted inside the piston and piston rod end, releases excess fluid pressure in the rebound chamber. A compression chamber pressure relief valve, mounted inside the intake valve assembly, releases excess fluid pressure in the compression chamber.

20 Claims, 7 Drawing Sheets

(56) References Cited

U.S. PATENT DOCUMENTS

| | | | |
|---|---|---|---|
| 6,302,248 B1* | 10/2001 | Nakadate | F16F 9/466 188/266.6 |
| 6,464,048 B1 | 10/2002 | Groves et al. | |
| 6,527,093 B2* | 3/2003 | Oliver | F16F 9/464 188/315 |
| 6,533,085 B2 | 3/2003 | Moradmand et al. | |
| 8,584,818 B2* | 11/2013 | Murakami | F16F 9/348 188/322.15 |
| 8,899,391 B2* | 12/2014 | Yamasaki | F16F 9/50 188/315 |
| 9,169,888 B2* | 10/2015 | Nishimura | F16F 9/3235 |
| 9,353,822 B2* | 5/2016 | Yamasaki | B23P 19/04 |
| 10,208,830 B2 | 2/2019 | Bruno et al. | |
| 10,344,819 B2* | 7/2019 | Schmidt | F16F 9/3207 |
| 10,458,509 B2* | 10/2019 | Kobayashi | F16F 9/3488 |
| 11,131,361 B2 | 9/2021 | Cox | |
| 11,555,525 B2* | 1/2023 | Schmidt | F16F 9/369 |
| 11,906,015 B2* | 2/2024 | Deferme | F16F 9/185 |
| 12,146,548 B2* | 11/2024 | Deferme | F16F 9/185 |
| 2011/0073424 A1* | 3/2011 | Murakami | F16F 9/465 188/322.13 |
| 2011/0315494 A1* | 12/2011 | Marking | F16F 9/56 188/313 |
| 2018/0172106 A1 | 6/2018 | Patzenhauer et al. | |
| 2019/0107170 A1 | 4/2019 | Inamitsu et al. | |
| 2019/0120319 A1 | 4/2019 | Inamitsu et al. | |
| 2019/0293144 A1* | 9/2019 | Patel | F16F 9/526 |
| 2019/0293146 A1* | 9/2019 | Patel | F16F 9/185 |
| 2020/0049220 A1* | 2/2020 | Kim | F16F 9/185 |
| 2020/0132155 A1* | 4/2020 | Cox | F16F 9/516 |
| 2020/0208704 A1 | 7/2020 | Deferme | |
| 2020/0208705 A1 | 7/2020 | Deferme | |
| 2020/0269647 A1 | 8/2020 | Strickland et al. | |
| 2021/0270342 A1* | 9/2021 | Deferme | F16F 9/46 |

* cited by examiner

SPACE SAVING PRESSURE RELIEF VALVES FOR SUSPENSION DAMPERS

FIELD

The present disclosure generally relates to dampers used in vehicle suspension systems. More particularly, the present disclosure relates to pressure relief valves in suspension dampers.

BACKGROUND

This section provides background information related to the present disclosure which is not necessarily prior art.

Vehicles generally include dampers that are used in conjunction with suspension systems to absorb vibrations that occur while driving the vehicle. In order to absorb the vibrations, dampers are generally connected between a body and the suspension system of the vehicle. A piston is located within the damper. The piston is connected to the vehicle body or the suspension of the vehicle through a piston rod. The damper also includes a damper body that is connected to the suspension system. As the damper is compressed or extended, the piston may limit the flow of damping fluid between rebound and compression chambers that are defined within the damper body in order to produce a damping force that counteracts the vibrations. By further restricting the flow of damping fluid between the rebound and compression chambers of the damper, greater damping forces may be generated by the damper.

Dampers typically include one or more valves that control the flow of fluid during extension and compression motions of the piston. Many current damper designs utilize externally mounted, electromechanical valves to control extension and compression damping. However, internal pressures in such systems can exceed design requirements.

SUMMARY

This section provides a general summary of the disclosure and is not a comprehensive disclosure of its full scope or all of its features.

In accordance with one aspect of the present disclosure, a damper is provided. The damper includes a pressure tube that extends co-axially about a longitudinal axis and longitudinally between first and second pressure tube ends. The damper includes a piston slidably disposed within the pressure tube. The piston defines a rebound chamber and a compression chamber within the pressure tube. The rebound chamber is longitudinally positioned between the piston and the first pressure tube end and the compression chamber is longitudinally positioned between the piston and the second pressure tube end. The piston extends longitudinally between a first piston end that faces the rebound chamber and a second piston end that faces the compression chamber. A piston rod extends co-axially with the longitudinal axis between a first piston rod end and second piston rod end. The second piston rod end is fixedly coupled to the piston. The damper also includes an outer tube disposed around the pressure tube. The outer tube extends longitudinally between first and second outer tube ends.

The damper includes an intake valve assembly that is positioned at the second pressure tube end and an accumulation chamber that is positioned longitudinally between the intake valve assembly and the second outer tube end. An intermediate chamber is defined by the intake valve assembly at a position between the compression chamber and the accumulation chamber. The intake valve assembly includes an intermediate passageway that extends longitudinally through the intake valve assembly and that is arranged in fluid communication with the intermediate chamber and the compression chamber.

The damper has at least one control valve that is externally mounted to the outer tube. The control valve has a control valve inlet that is arranged in fluid communication with the intermediate chamber and a control valve outlet that is arranged in fluid communication with both the fluid transport chamber and the accumulation chamber. One or more rebound chamber pressure relief passageways extend through the piston from the rebound chamber to the compression chamber and one or more compression chamber pressure relief passageways extend through the intake valve assembly between the intermediate passageway and the accumulation chamber. The damper further includes a rebound chamber pressure relief valve that is configured to permit fluid flow through the rebound chamber pressure relief passageway(s) in one direction from the rebound chamber to the compression chamber when fluid pressure in the rebound chamber exceeds a blow-off pressure threshold of the rebound chamber pressure relief valve. The damper also includes a compression chamber pressure relief valve that is configured to permit fluid flow through the compression chamber pressure relief passageway(s) in one direction from the intermediate passageway to the accumulation chamber when fluid pressure in the compression chamber exceeds a blow-off pressure threshold of the compression chamber pressure relief valve.

In accordance with another aspect of the present disclosure, the rebound chamber pressure relief valve comprises at least one rebound chamber pressure relief passageway that extends through the piston from the first piston end to the second piston end, a plunger bore that extends longitudinally within the second piston rod end, a plunger extending longitudinally between a first plunger end that is slidably received in the plunger bore and a second plunger end that extends out from the plunger bore into the compression chamber, a valve head that is fixedly coupled to the second plunger end, and a spring positioned in the plunger bore that biases the plunger towards the first piston rod end such that the plunger pulls the valve head against the second piston end to obstruct fluid flow through the at least one rebound chamber pressure relief passageway in a rebound chamber pressure relief valve closed position.

In accordance with another aspect of the present disclosure, the compression chamber pressure relief valve comprises at least one compression chamber pressure relief passageway that extends through the intake valve assembly between the intermediate passageway and the accumulation chamber, a plunger cavity that extends longitudinally within the intake valve assembly, a plunger extending longitudinally between a first plunger end that is slidably received in the plunger cavity and a second plunger end that extends out from the plunger cavity into the accumulation chamber, a valve head that is fixedly coupled to the second plunger end, and a spring positioned in the plunger cavity that biases the plunger away from the second outer tube end such that the plunger pulls the valve head against the second intake valve assembly end to obstruct fluid flow through the at least one compression chamber pressure relief passageway in a compression chamber pressure relief valve closed position.

Advantageously, the way in which the rebound chamber pressure relief valve is constructed and positioned inside the piston and the second piston rod end adds rebound chamber pressure relief (i.e., blow-off) functionality to the damper over and above the flowrate capabilities of the intake valve assembly and the external control valve(s) without reducing or limiting the amount of travel permitted by the damper or increasing the overall length of the damper. Similarly, the way in which the compression chamber relief valve is constructed and positioned inside the intake valve assembly adds compression chamber pressure relief (i.e., blow-off) functionality to the damper over and above the flowrate capabilities of the intake valve assembly and the external control valve(s) without reducing or limiting the amount of travel permitted by the damper or increasing the overall length of the damper.

BRIEF DESCRIPTION OF DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings. Wherever possible, the same reference numbers will be used throughout the drawings to refer to same or like parts.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
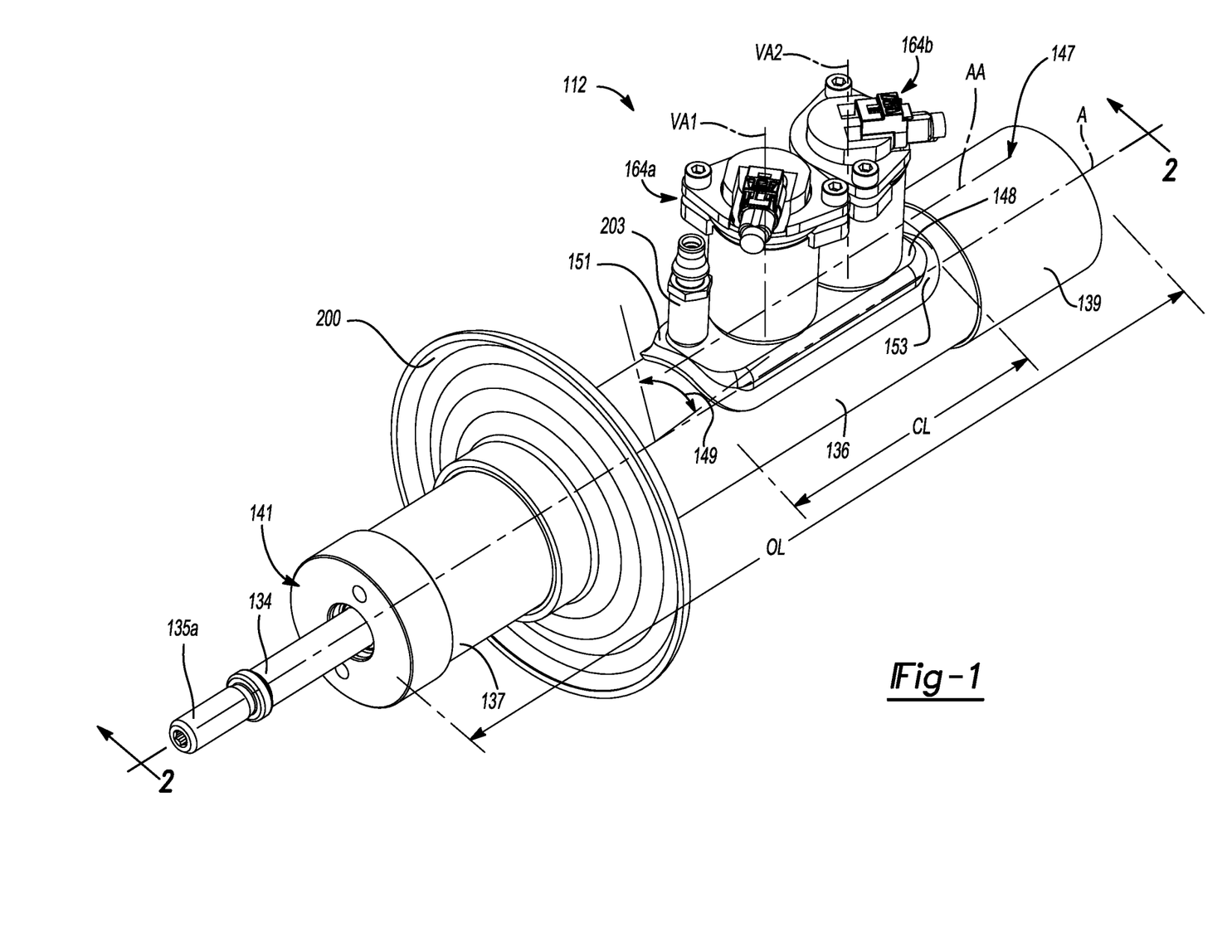
FIG. 1 is a side perspective view of an exemplary damper constructed in accordance with the present disclosure.
Figure 2:
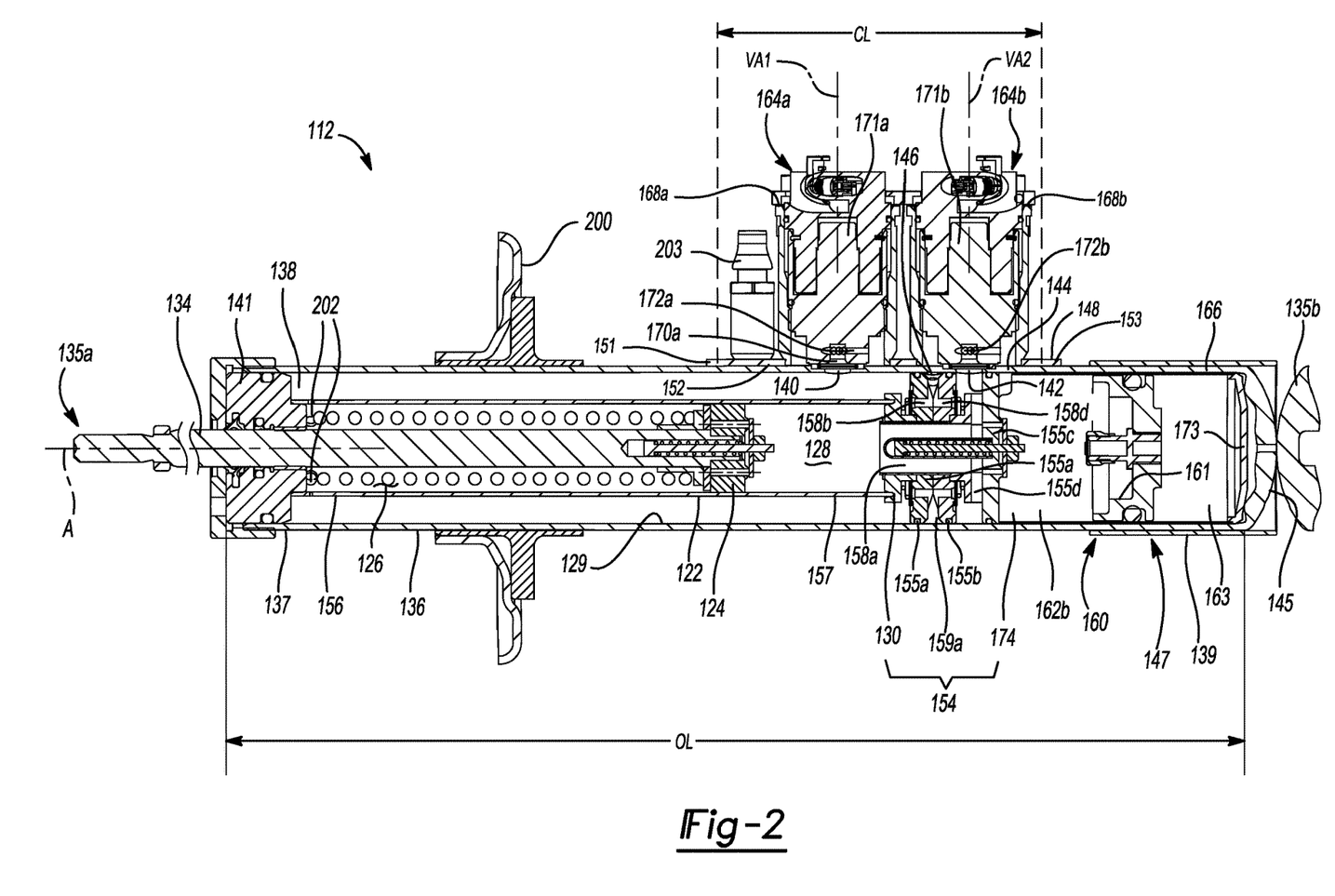
FIG. 2 is a side cross-sectional view of the exemplary damper shown in FIG. 1 taken along line 2-2.

FIGS. 1 and 2 illustrate an exemplary damper 112 for a vehicle (not shown). The damper 112 contains a fluid, such as hydraulic fluid or oil, by way of example and without limitation. The damper 112 includes a pressure tube 122 that extends longitudinally between a first pressure tube end 156 and a second pressure tube end 157. A piston 124 is slidably disposed within the pressure tube 122. The piston 124 defines a rebound chamber 126 and a compression chamber 128 within the pressure tube 122. Each of the rebound and compression chambers 126, 128 contain the fluid therein. The rebound chamber 126 is positioned longitudinally between the piston 124 and the first pressure tube end 156 while the compression chamber 128 is positioned longitudinally between the piston 124 and the second pressure tube end 157. The volume of the rebound and compression chambers 126, 128 varies based on the movement of the piston 124. The piston 124 has a cylindrical surface that seals against the inside of the pressure tube 122 and extends longitudinally between a first piston end 125 that faces the rebound chamber 126 and a second piston end 127 that faces the compression chamber 128.

The damper 112 includes a piston rod 134. The piston rod 134 is coaxially aligned with and defines a longitudinal axis A. The piston rod 134 extends longitudinally between a first piston rod end 135a that is configured to be connected to a component of the suspension system 102 or the body 104 of the vehicle 100 and a second piston rod end 135b that is connected to the piston 124.

The damper 112 also includes an outer tube 136 disposed annularly around the pressure tube 122 and includes an inner cylindrical surface 129 that faces and is spaced from the pressure tube 122. In some embodiments, including the one shown, the outer tube 136 is concentrically disposed around the pressure tube 122 about the longitudinal axis A. The outer tube 136 extends longitudinally between a first outer tube end 137 and a second outer tube end 139. The piston rod 134 extends longitudinally out through the first outer tube end 137. The outer tube 136 includes a closed portion 145 at the second outer tube end 139 and a cylindrical portion 147 that extends from the first outer tube end 137 to the closed portion 145 at the second outer tube end 139. Optionally, an attachment fitting 143 is mounted to the closed portion 145 of the outer tube 136. The attachment fitting 143 may be provided in the form of a hole, loop, threaded stud, or other attachment structure and is configured to attach to a component of the suspension system 102 or the body 104 of the vehicle 100. Optionally, a spring seat 200 is mounted to and extends annularly from the outer tube 136 at a location adjacent to the first outer tube end 137. The spring seat 200 may be provided to configure the damper 112 such that it may be used in a coil-over arrangement, where the spring seat 200 supports one end of a coil spring of a vehicle suspension system (not shown).

The damper 112 includes a fluid transport chamber 138 that is disposed between the pressure tube 122 and the outer tube 136. The piston rod 134 extends longitudinally through a rod guide 141, which is positioned at the first outer tube end 137. Portions of the rod guide 141 mate with the first outer tube end 137 and the first pressure tube end 156. Just inboard of the rod guide 141, the first pressure tube end 156 includes one or more openings 202 that provide fluid communication between the rebound chamber 126 and the fluid transport chamber 138. Stated another way, the fluid transport chamber 138 is arranged in fluid communication with the rebound chamber 126 via the openings 202 in the first pressure tube end 156.

The damper 112 further includes a cover member 148 that is attached to the outer cylindrical surface 131 of the outer tube 136. By way of example and without limitation, the cover member 148 may be welded to the outer cylindrical surface 131 of the outer tube 136. A collector chamber 152 is defined between the cover member 148 and the outer tube 136. Thus, in accordance with this arrangement, the collector chamber 152 is positioned external to (i.e., radially outward of) the outer tube 136. Optionally, a charge fitting 203 may be provided on the cover member 148 to provide a location where the collector chamber 152 can be filled or re-filled with hydraulic fluid or oil.

First and second control valves 164a, 164b are externally mounted to the cover member 148 on the outer tube 136. Although other types of control valves can be used, in the illustrated embodiment the first and second control valves 164a, 164b are electro-mechanical valves. The operation of the first and second control valves 164a, 164b will be explained in greater detail below, but at a high level, the first and second control valves 164a, 164b regulate two fluid flow paths that can transport fluid into and out of the collector chamber 152. The first control valve 264a has a first control valve axis VA1 and the second control valve 264b has a second control valve axis VA2. The first and second control valve axes VA1 and VA2 are parallel and longitudinally spaced apart from one another, are circumferentially aligned with one another along a control valve alignment axis AA, and are arranged perpendicular to the longitudinal axis A and the control valve alignment axis AA. In other words, both the first and second control valve axes VA1 and VA2 intersect the longitudinal axis A and the control valve alignment axis AA.

In the illustrated example, the collector chamber 152 has a limited circumferential extent that extends about the outer tube in an arc 149 that is less than or equal to 180 degrees. In other words, the collector chamber 152 in the illustrated example runs longitudinally along the outer tube 136 on each side of the control valve alignment axis AA. The outer tube 136 has an outer tube length OL that is measured longitudinally between the first and second outer tube ends 137, 139 and the collector chamber 152 has a collector chamber length CL that is measured longitudinally between first and second collector ends 151, 153. The collector chamber length CL is shorter than the outer tube length OL. In other words, the collector chamber 152 is shorter than the outer tube 136 and does not run along the entire length of the outer tube 136.

With additional reference to FIGS. 3-7, the damper 112 includes an intake valve assembly 154 that is disposed inside the outer tube 136 and extends longitudinally between a first intake valve assembly end 176 and a second intake valve assembly end 178. The intake valve assembly 154 includes an adapter body 130 at the first intake valve assembly end 176, a first intake valve body 155a that abuts the adapter body 130, a second valve body 155b that abuts the first intake valve body 155a, a divider body 155c at the second intake valve assembly end 178, and a retainer body 155d that is positioned longitudinally between the second intake valve body 155b and the divider body 155c in an abutting arrangement. The retainer body 155d includes a tubular stem 210 that extends longitudinally towards the first intake valve assembly end 176 and defines an intermediate passageway 158a therein. The adapter body 130 is press-fit onto the second pressure tube end 157. In addition, the adapter body 130 and the first and second intake valve bodies 155a, 155b are slid over and supported by the tubular stem 210 of the of the retainer body 155d and a retainer ring 211 snaps into a circumferentially extending groove in the tubular stem 210 to secure the adapter body 130 and the first and second intake valve bodies 155a, 155b on the tubular stem 210 of the of the retainer body 155d. The first and second intake valve bodies 155a, 155b and the divider body 155c abut the inner cylindrical surface 129 of the outer tube 136 to define first and second intermediate chambers 159a, 159b inside the outer tube 136.

The first intermediate chamber 159a is positioned longitudinally between the first and second intake valve bodies 155a, 155b and the second intermediate chamber 159b is positioned longitudinally between the second intake valve body 155b and the divider body 155c. An accumulation chamber 162 is positioned longitudinally between the divider body 155c and the second outer tube end 139. Thus, the first intake valve body 155*a* forms a partition between the first intermediate chamber 159*a* and the fluid transport chamber 138, the second intake valve body 155*b* forms a partition between the first and second intermediate chambers 159*a*, 159*b*, and the divider body 155*c* forms a partition between the second intermediate chamber 159*b* and the accumulation chamber 162.

The intake valve assembly 154 also includes a first intake valve 165*a* that is mounted to the first intake valve body 155*a* and a second intake valve 165*b* that is mounted to the second intake valve body 155*b*. The intermediate passageway 158*a* in the tubular stem 210 of the of the retainer body 155*d* extends longitudinally through the intake valve assembly 154 from the first intake valve assembly end 176, through adapter body 130, through the first and second intake valve bodies 155*a*, 155*b*, and through the retainer body 155*d* to the second intake valve assembly end 178. As such, the intermediate passageway 158*a* extends longitudinally through the intake valve assembly 154 and is arranged in fluid communication with the compression chamber 128 and the second intermediate chamber 159*b*.

The first intake valve 165*a* controls fluid flow through the intake valve assembly 154 between the first intermediate chamber 159*a* and the fluid transport chamber 138 while the second intake valve 165*b* controls fluid flow through the intake valve assembly 154 between the first intermediate chamber 159*a* and the second intermediate chamber 159*b*, which leads to the intermediate passageway 158*a* and ultimately the compression chamber 128.

In accordance with the illustrated embodiment, the damper 112 includes an accumulator insert 160 that is disposed within the second outer tube end 139. The accumulator insert 160 includes an accumulator sleeve 166, a floating piston 161, and a pressurized chamber (e.g., a gas chamber) 163. The accumulator sleeve 166 is positioned inside the outer tube 136 and extends between a closed end 173 adjacent to the second outer tube end 139 and an open end 174 adjacent to the intake valve assembly 154. The floating piston 161 is preassembled inside the accumulator sleeve 166 in a sliding fit. The pressurized chamber 163 is separated from the accumulation chamber 162 by the floating piston 161. Therefore, the accumulation chamber 162 is positioned longitudinally between the intake valve assembly 154 and the floating piston 161 and the pressurized chamber 163 is positioned longitudinally between the floating piston 161 and the closed end 173. The pressurized chamber 163 contains a pressurized fluid, such as a gas, that operates to bias the floating piston 161 towards the intake valve assembly 154.

The accumulator sleeve 166 extends longitudinally between the second outer tube end 139 and the intake valve assembly 154 such that the closed end 173 of the accumulator sleeve 166 abuts (i.e., contacts) the closed portion 145 of the second outer tube end 139 and such that the open end 174 of the accumulator sleeve 166 abuts the divider body 155*c* of the intake valve assembly 154. Accordingly, the intake valve assembly 154 is clamped between the open end 174 of the accumulator sleeve 166 and the second pressure tube end 157 of pressure tube 122. In accordance with this arrangement, the first and second intake valve bodies 155*a*, 155*b* and the divider body 155*c* do not need to be mechanically attached to the outer tube 136 (such as by welding) because the intake valve assembly 154 is held in place by the accumulator sleeve 166 and the pressure tube 122.

Figure 3:
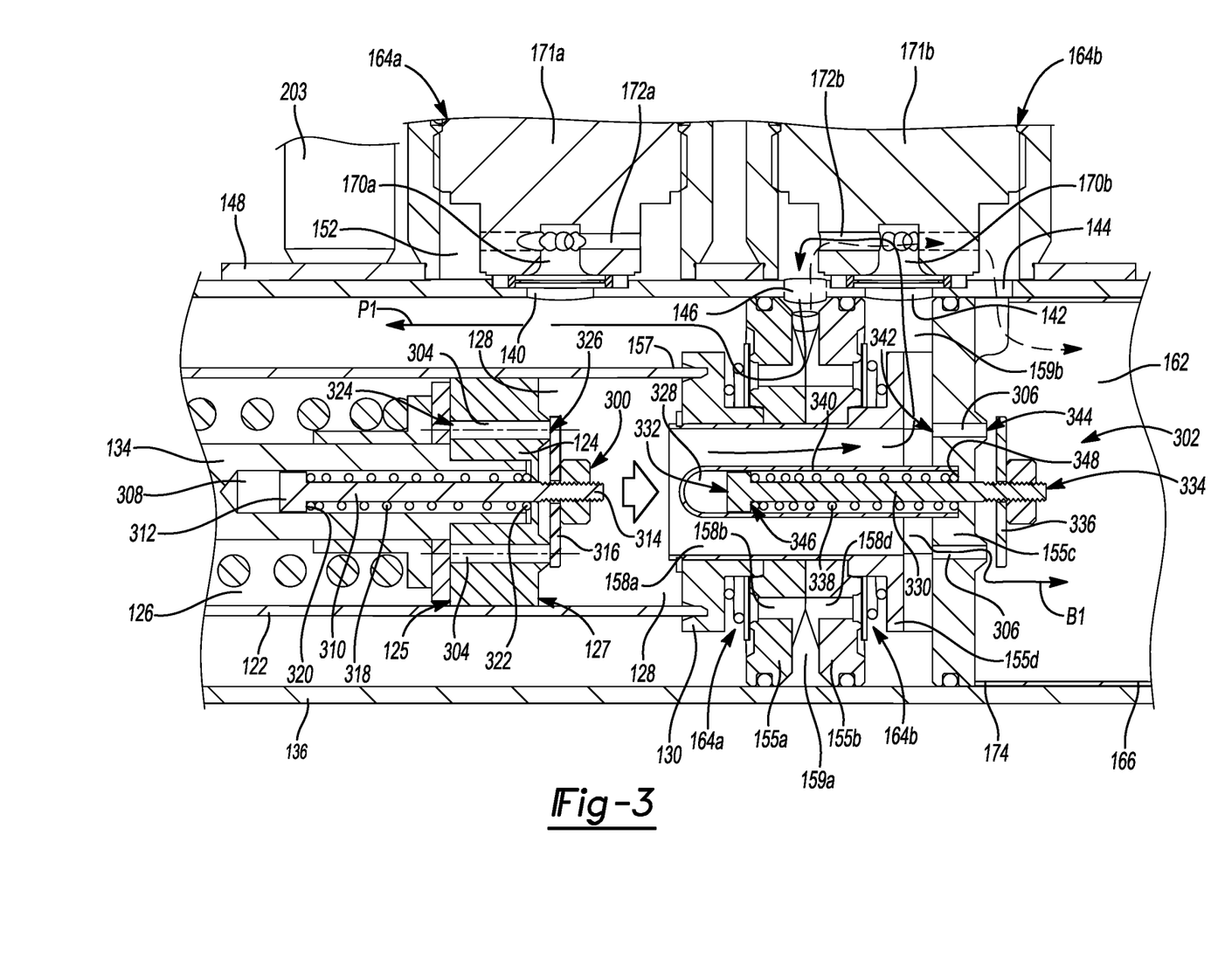
FIG. 3 is an enlarged side cross-sectional view of the exemplary damper shown in FIG. 2, where arrows are included illustrating the fluid flow path through the damper during a compression stroke.
Figure 4:
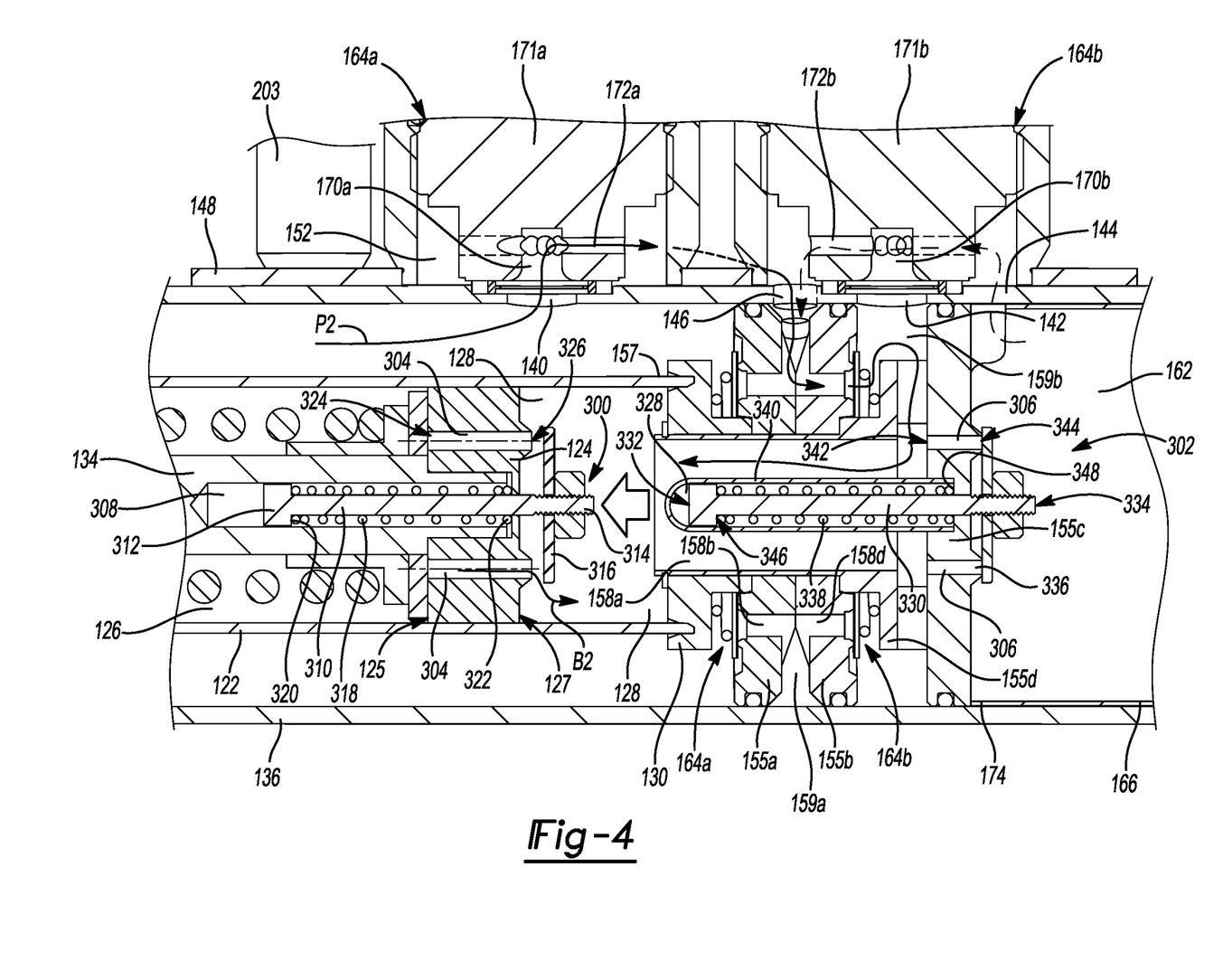
FIG. 4 is another enlarged side cross-sectional view of the exemplary damper shown in FIG. 2, where arrows are included illustrating the fluid flow path through the damper during an extension/rebound stroke.

With reference to FIGS. 2-4, the first control valve 164*a* has a first control valve inlet 170*a* that is arranged in fluid communication with the fluid transport chamber 138 between the inner and outer tubes 122, 136 and a first control valve outlet 172*a* that is arranged in fluid communication with the collector chamber 152. A first control valve port 140 in the outer tube 136 is arranged in fluid communication with and extends between the fluid transport chamber 138 and the first control valve inlet 170*a*. The second control valve 164*b* has a second control valve inlet 170*b* that is arranged in fluid communication with the second intermediate chamber 159*b* and a second control valve outlet 172*b* that is arranged in fluid communication with the collector chamber 152. A second control valve port 142 in the outer tube 136 is arranged in fluid communication with and extends between the second intermediate chamber 159*b* and the second control valve inlet 170*b*. The first control valve 164*a* therefore regulates fluid flow from the fluid transport chamber 138 to the collector chamber 152 and the second control valve 164*b* regulates fluid flow from the second intermediate chamber 159*b* to the collector chamber 152.

One or more accumulator ports 144 in the outer tube 136 are arranged in fluid communication with and extend between the collector chamber 152 and the accumulation chamber 162, while one or more open ports 146 in the outer tube 136 are arranged in fluid communication with and extend between the collector chamber 152 and the first intermediate chamber 159*a*. In other words, the accumulator chamber 162 is arranged in fluid communication with the collector chamber 152 via the accumulator port(s) 144 in the outer tube 136 and the first intermediate chamber 159*a* is arranged in fluid communication with the collector chamber 152 via the open port(s) 146 in the outer tube 136. The accumulator port(s) 144 and open port(s) 146 in the outer tube 136 are provided in the form of open holes, slots, or apertures that are not open or closed by a valve. As such, fluid may freely flow between the collector chamber 152 and the accumulation chamber 162 and between the collector chamber 152 and the first intermediate chamber 159*a*.

In the open position, the first control valve 164*a* allows fluid communication between the fluid transport chamber 138 and the collector chamber 152. More particularly, the first control valve inlet 170*a* is in fluid communication with the fluid transport chamber 138 and the first control valve outlet 172*a* is in fluid communication with the collector chamber 152. First valve member 171*a* allows selective fluid communication between the first control valve inlet 170*a* and the first control valve outlet 172*a* and therefore selective fluid flow between the fluid transport chamber 138 and the collector chamber 152, which ultimately regulates fluid flow from the rebound chamber 126 to the compression chamber 128.

In the open position, the second control valve 164*b* allows fluid communication between the second intermediate chamber 159*b* and the collector chamber 152. More particularly, the second control valve inlet 170*b* is in fluid communication with the second intermediate chamber 159*b* and the second control valve outlet 172*b* is in fluid communication with the collector chamber 152. Second valve member 171*b* allows selective fluid communication between the second control valve inlet 170*b* and the second control valve outlet 172*b* and therefore selective fluid flow between the second intermediate chamber 159*b* and the collector chamber 152, which ultimately regulates fluid flow from the compression chamber 128 to both the fluid transport chamber 138 and the accumulation chamber 162.

As shown in FIG. 3, when the piston 124 moves towards the intake valve assembly 154 during a compression stroke, the volume of the compression chamber 128 decreases. The second control valve 164*b* is actuated to the open position during compression strokes of the damper 112 to regulate fluid flow from the second intermediate chamber 159b to the collector chamber 152. Specifically, the degree of opening of the second control valve 164b may be regulated to adjust the compression damping characteristics of the damper 112. At the same time, the first control valve 164a is in the closed position during compression strokes of the damper 112. As a result, there is no communication of fluid directly between the fluid transport chamber 138 and the collector chamber 152 during a compression stroke.

During a compression stroke, a compression flow path P1 is defined inside the damper 112, where fluid in the compression chamber 128 flows through the intermediate passageway 158a in the first intake valve assembly 154 and into the second intermediate chamber 159b. Fluid in the second intermediate chamber 159b flows to the second control valve inlet 170b and passes through the second control valve port 142 in the outer tube 136. Fluid from the second control valve inlet 170b flows to the second control valve outlet 172b because the second control valve 164b is in the open position and fluid from the second control valve outlet 172b flows into the collector chamber 152. The fluid flowing into the collector chamber 152 flows into the accumulation chamber 162 via the accumulation port(s) 144 in the outer tube 136 and into the first intermediate chamber 159a via the open port(s) 146 in the outer tube 136. If the pressure differential between the first intermediate chamber 159a and the fluid transport chamber 138 exceeds the break pressure of the first intake valve 165a, the first intake valve 165a will open and fluid will flow through a first set of intake orifices 158b in the first intake valve body 155a and into the fluid transport chamber 138. Some of the fluid in the fluid transport chamber 138 then flows through the openings 202 in the first pressure tube end 156 and into the rebound chamber 126, which increases in volume during compression strokes. Also, as a greater length of the piston rod 134 moves into the rebound chamber 126 during a compression stroke, the volume of the fluid that is displaced by the piston rod 134 increases. The fluid that is displaced by the piston rod 134 (i.e., the rod volume) flows into the collector chamber 152, through the accumulator port(s) 144, and into the accumulation chamber 162, which causes the floating piston 161 to move away from the intake valve assembly 154, increasing the size of the accumulation chamber 162.

As shown in FIG. 4, when the piston 124 moves away from the intake valve assembly 154 during an extension/rebound stroke, the volume of fluid in the compression chamber 128 increases. The first control valve 164a is actuated to the open position during extension strokes of the damper 112 to regulate fluid flow from the fluid transport chamber 138 to the collector chamber 152. Specifically, the degree of opening of the first control valve 164a may be regulated to adjust the extension/rebound damping characteristics of the damper 112. At the same time, the second control valve 164b is in the closed position during extension strokes of the damper 112. As a result, there is no communication of fluid directly between the second intermediate chamber 159b and the collector chamber 152 during an extension stroke.

During an extension/rebound stroke, a rebound flow path P2 is defined inside the damper 112, where fluid in the rebound chamber 126 flows into the fluid transport chamber 138 via the openings 202 in the first pressure tube end 156 and the fluid in the fluid transport chamber 138 then flows to the first control valve inlet 170a and passes through the first control valve port 140 in the outer tube 136. Fluid from the first control valve inlet 170a flows to the first control valve outlet 172a because the first control valve 164a is in the open position and fluid from the first control valve outlet 172a flows into the collector chamber 152. Fluid from the collector chamber 152 flows into the first intermediate chamber 159a via the open port(s) 146 in the outer tube 136. When the pressure differential between the first intermediate chamber 159a and the second intermediate chamber 159b exceeds the break pressure of the second intake valve 165b, the second intake valve 165b will open and fluid in the first intermediate chamber 159a will flow through a second set of intake orifices 158d in the second intake valve body 155b, through the second intermediate chamber 159b, through a plurality of channels 204 in the retainer body 155d, through the intermediate passageway 158a in the first intake valve assembly 154, and into the compression chamber 128. Also, the volume that is displaced by the piston rod 134 (i.e., the rod volume) decreases during an extension/rebound stroke, so an additional flow of fluid must be supplied from the accumulation chamber 162 to compensate for the decrease in the rod volume. Thus, some of the fluid in the accumulation chamber 162 flows through the accumulator port(s) 144 and into the collector chamber 152 where it joins the extension flow path P2. The net flow of fluid out of the accumulation chamber 162 causes the floating piston 161 to move towards the intake valve assembly 154, decreasing the size of the accumulation chamber 162. Thus, the intake valve assembly 154 allows bi-directional flow of fluid to and from the compression chamber 128.

As previously explained, the first and second control valves 164a, 164b are externally mounted on the outer tube 136 such that the first and second control valve ports 140, 142 are circumferentially aligned with each other on the outer tube 136 along the control valve alignment axis AA. To minimize the overall height of the first and second control valves 164a, 164b, the cover member 148 may be externally mounted to the outer tube 136 in such a way that the cover member abuts/contacts the outer cylindrical surface 131 of the outer tube 136 along the control valve alignment axis AA. In accordance with this space saving arrangement, the collector chamber 152 runs on each side of the control valve alignment axis AA, while the accumulator port(s) 144 and the open port(s) 146 in the outer tube 136 are offset relative to the first and second control valve ports 140, 142, such that the accumulator port(s) 144 and the open port(s) 146 in the outer tube 136 are circumferentially spaced relative to the control valve alignment axis AA. In other words, the ports 140, 142, 144, and 146 in the outer tube 136 of the damper 112 are arranged such that the control valve alignment axis AA bisects the first and second control valve ports 140, 142, but does not bisect the accumulator port(s) 144 and the open port(s) 146 due to their offset arrangement, which places the accumulator port(s) 144 and the open port(s) 146 in direct fluid communication with the collector chamber 152.

With reference to FIGS. 2-6, the piston 124 includes a rebound chamber pressure relief valve 300 to limit high internal pressures within the rebound chamber 126 and a compression chamber pressure relief valve 302 to limit high internal pressures within the compression chamber 128. The piston 124 includes one or more rebound chamber pressure relief passageways 304 that extend through the piston 124 from the rebound chamber 126 to the compression chamber 128. The intake valve assembly 154 includes one or more compression chamber pressure relief passageways 306 that extend through the intake valve assembly 154 between the intermediate passageway 158a and the accumulation chamber 162.

The rebound chamber pressure relief valve 300 is configured to permit fluid flow through the rebound chamber pressure relief passageway(s) 304 in one direction from the rebound chamber 126 to the compression chamber 128 when fluid pressure in the rebound chamber 126 exceeds a blow-off pressure threshold of the rebound chamber pressure relief valve 300. In addition to the rebound chamber pressure relief passageway(s) 304, the rebound chamber pressure relief valve 300 includes a plunger bore 308 that extends longitudinally within the second piston rod end 135b and a plunger 310 that extends longitudinally between a first plunger end 312 that is slidably received in the plunger bore 308 and a second plunger end 314 that extends out from the plunger bore 308 into the compression chamber 128. The rebound chamber pressure relief valve 300 also includes a valve head 316 that is fixedly coupled to the second plunger end 314 and a spring 318 that is positioned in the plunger bore 308. The spring 318 biases the plunger 310 towards the first piston rod end 135a such that the plunger 308 pulls the valve head 316 against the second piston end 127 to obstruct fluid flow through the rebound chamber pressure relief passageway(s) 304 when the rebound chamber pressure relief valve 300 is in a rebound chamber pressure relief valve closed position (as illustrated in FIG. 3).

The plunger 308 of the rebound chamber pressure relief valve 300 includes a first spring seat 320 that extends radially out from the first plunger end 312 and the piston 124 includes a second spring seat 322. The spring 318 is a coil-spring that extends helically about the plunger 308 and longitudinally between the first and second spring seats 320, 322. When the rebound chamber pressure relief valve 300 is fully assembled, the spring 318 applies a biasing force to the first plunger end 312, in a direction pointing away from the compression chamber 128, that defines a blow-off pressure threshold of the rebound chamber pressure relief valve 300. The plunger 308 and the valve head 316 of the rebound chamber pressure relief valve 300 are configured to slide longitudinally such that the valve head 316 will move away from the second piston end 127 and permit fluid flow B2 to pass through the rebound chamber pressure relief passageway(s) 304 to define a rebound chamber pressure relief valve open position when fluid pressure in the rebound chamber 126 exceeds the blow-off pressure threshold of the rebound chamber pressure relief valve 300 (as shown in FIG. 4).

Figure 5:
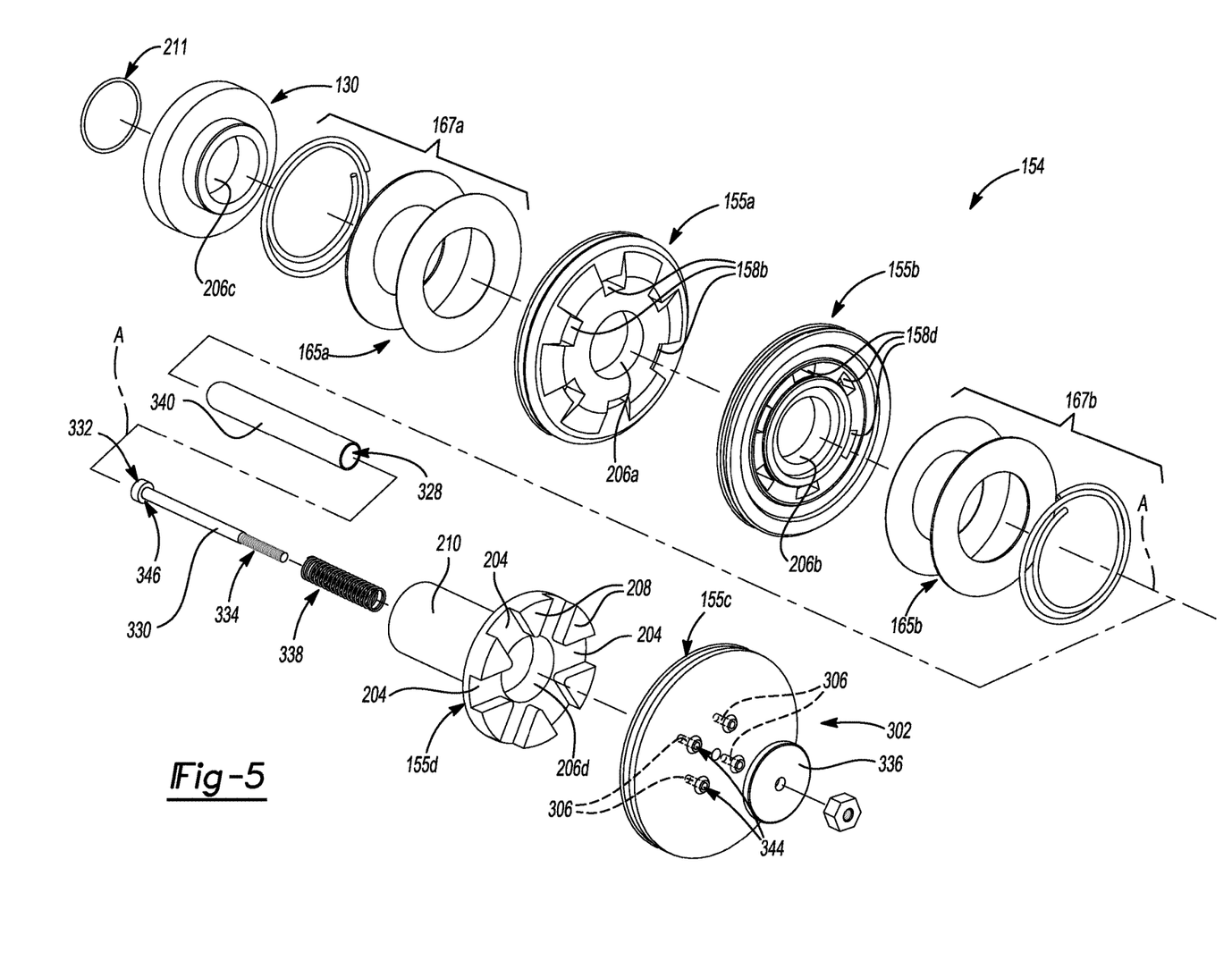
FIG. 5 is a bottom exploded perspective view of an exemplary intake valve assembly of the exemplary damper shown in FIG. 1.
Figure 6:
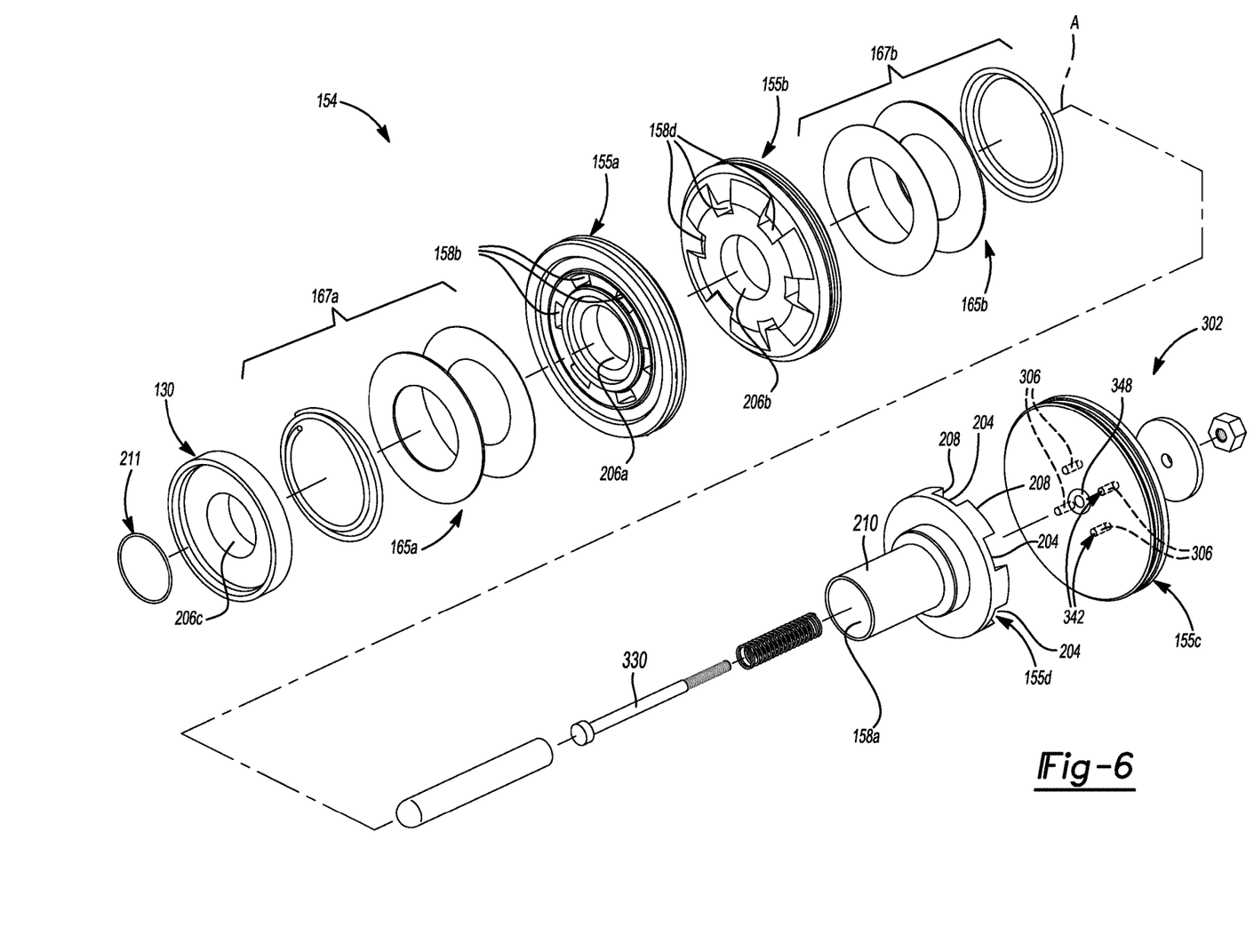
FIG. 6 is a top exploded perspective view of the exemplary intake valve assembly of the exemplary damper shown in FIG. 1.

As best seen in FIGS. 5 and 6, the rebound chamber pressure relief passageway(s) 304 extend through the piston 124 at circumferentially spaced locations. Each rebound chamber pressure relief passageway 304 has a first rebound passageway opening 324 on the first piston end 125 and a second rebound passageway opening 326 on the second piston end 127. The first rebound passageway openings 324 are open and unobstructed and are therefore always arranged in fluid communication with the rebound chamber 126. The second rebound passageways 326 on the other hand are open and closed by longitudinal movement of the valve head 316 as the valve head 316 moves into and out of contact with the second piston end 127. While other configurations are possible, in the illustrated example, the valve head 316 is provided in the form of a sealing disc that has a flat, disc-like shape that is secured to the plunger 310 by a nut that is threaded onto the second plunger end 314. Because the second piston rod end 135b does not extend longitudinally beyond the second piston end 127 into the compression chamber 128, this arrangement of the rebound chamber pressure relief valve 300 does not reduce the amount of travel permitted by the damper 112 or increase the overall length OL of the damper 112.

The compression chamber pressure relief valve 302 is configured to permit fluid flow through the compression chamber pressure relief passageway(s) 306 in one direction from the intermediate passageway 158a to the accumulation chamber 162 when fluid pressure in the compression chamber 128 exceeds a blow-off pressure threshold of the compression chamber pressure relief valve 302. In addition to the compression chamber pressure relief passageway(s) 306, the compression chamber pressure relief valve 302 includes a plunger cavity 328 that extends longitudinally within the intake valve assembly 154 and a plunger 330 that extends longitudinally between a first plunger end 332 that is slidably received in the plunger cavity 328 and a second plunger end 334 that extends out from the plunger cavity 328 into the accumulation chamber 162. The compression chamber pressure relief valve 302 also includes a valve head 336 that is fixedly coupled to the second plunger end 334 and a spring 338 that is positioned in the plunger cavity 328. The spring 338 biases the plunger 330 away from the second outer tube end 139 such that the plunger 330 pulls the valve head 336 against the divider body 155c at the second intake valve assembly end 178 to obstruct fluid flow through the compression chamber pressure relief passageway(s) 306 when the compression chamber pressure relief valve 302 is in a compression chamber pressure relief valve closed position (as illustrated in FIG. 4).

In the illustrated example, the compression chamber pressure relief valve 302 further includes a plunger housing 340 that extends longitudinally within the intermediate passageway 158a. The plunger housing 340 has a tubular shape that defines the plunger cavity 328 therein with one closed end and one open end. However, it should be appreciated that other arrangements are possible where the plunger housing 340 is eliminated and one or more components of the intake valve assembly 154 form the plunger cavity 328. The plunger 330 of the compression chamber pressure relief valve 302 includes a first spring seat 346 that extends radially out from the first plunger end 332 and the divider body 155c includes a second spring seat 348. The spring 338 is a coil-spring that extends helically about the plunger 330 and longitudinally between the first and second spring seats 346, 348. When the compression chamber pressure relief valve 302 is fully assembled, the spring 338 applies a biasing force to the first plunger end 332, in a direction pointing towards the compression chamber 128, that defines a blow-off pressure threshold of the compression chamber pressure relief valve 302. The plunger 330 and the valve head 336 of the compression chamber pressure relief valve 302 are configured to slide longitudinally such that the valve head 336 will move away from the divider body 155c/second intake valve assembly end 178 and permit fluid flow B1 to pass through the compression chamber pressure relief passageway(s) 306 to define a compression chamber pressure relief valve open position when fluid pressure in the compression chamber 128 exceeds the blow-off pressure threshold of the compression chamber pressure relief valve 302 (as shown in FIG. 3).

As best seen in FIGS. 5 and 6, the compression chamber pressure relief passageway(s) 306 extend through the divider body 155c at circumferentially spaced locations. Each compression chamber pressure relief passageway 306 has a first compression passageway opening 342 and a second compression passageway opening 344. The first compression passageway openings 342 on the divider body 155c are open to and arranged in fluid communication with the intermediate passageway 158a and therefore the compression chamber 128. On the other hand, the second compression passageways 344 on the divider body 155c are open and closed by longitudinal movement of the valve head 336 as the valve head 336 moves into and out of contact with the divider body 155c at the second intake valve assembly end 178. While other configurations are possible, in the illustrated example, the valve head 336 is provided in the form of a sealing disc that has a flat, disc-like shape that is secured to the plunger 330 by a nut that is threaded onto the second plunger end 334. Because the plunger housing 340 is positioned inside the intermediate passageway 158a of the intake valve assembly 154 and does not extend longitudinally into the compression chamber 128, this arrangement of the compression chamber pressure relief valve 302 does not reduce the amount of travel permitted by the damper 112 or increase the overall length OL of the damper 112.

Figure 7:
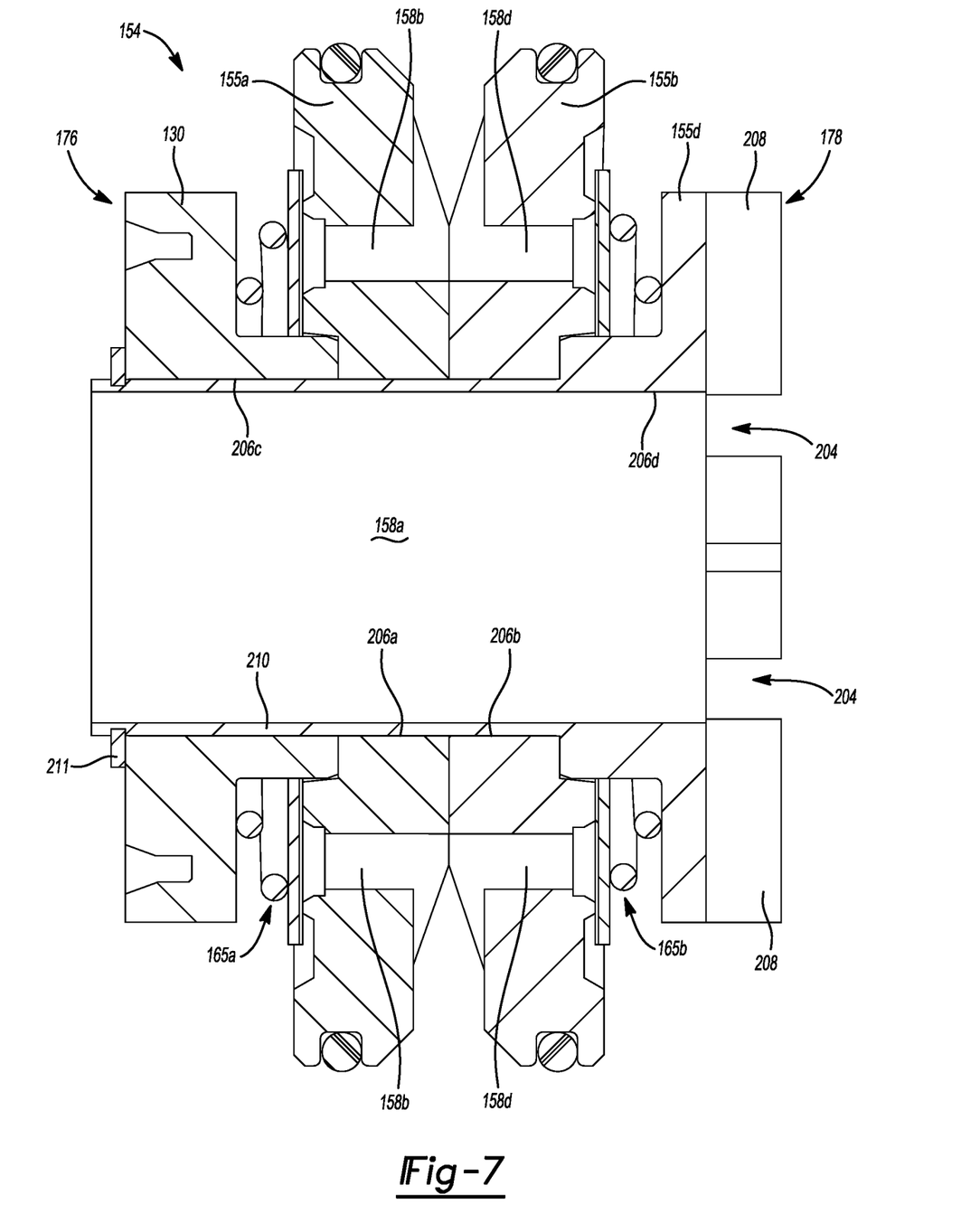
FIG. 7 is an enlarged side cross-sectional view of the exemplary intake valve assembly of the exemplary damper shown in FIG. 1.

With reference to FIGS. 5-7, the first and second intake valve bodies 155a, 155b of the intake valve assembly 154 are configured as vented discs, whereas the divider body 155c is shaped like a solid disk. In this embodiment, there are no orifices or passages in the divider body 155c. The first intake valve body 155a includes a first center bore 206a that extends through the first intake valve body 155a. The first set of intake orifices 158b are arranged circumferentially around (i.e., are radially outward of) the first center bore 206a. The second intake valve body 155b includes a second center bore 206b that extends through the second intake valve body 155b. The second set of intake orifices 158d are arranged circumferentially around (i.e., are radially outward of) the second center bore 206b. The adapter body 130 and the retainer body 155d each have a cylindrical hub portion that directly abuts one of the first and second intake valve bodies 155a, 155b and a disc-like flange portion that retains the first and second intake valves 165a, 165b such that both the adapter body 130 and the retainer body 155d have shapes similar to that of a top hat. In addition, the adapter body 130 and the retainer body 155d have third and fourth center bores 206c, 206d, respectively. The first center bore 206a in the first intake valve body 155a, the second center bore 206b in the second intake valve body 155b, the third center bore 206c in the adapter body 130, and the fourth center bore 206d in the retainer body 155d are aligned with one another and co-axially aligned with the central longitudinal axis A of the damper 112. The tubular stem 210 of the retainer body 155d extends through the first center bore 206a in the first intake valve body 155a, the second center bore 206b in the second intake valve body 155b, the third center bore 206c in the adapter body 130, and the fourth center bore 206d in the retainer body 155d while the fourth center bore 206d in the retainer body 155d defines the intermediate passageway 158a of the intake valve assembly 154. The retainer ring 211 snaps into a circumferentially extending groove in the tubular stem 210 of the retainer body 155d at a position near the first intake valve assembly end 176 to act as a stop that prevents the adapter body 130 and the first and second intake valve bodies 155a, 155b from sliding longitudinally on the tubular stem 210 of the of the retainer body 155d after final assembly.

Thus, the adapter body 130 and the first and second intake valve bodies 155a, 155b can be pre-assembled onto the tubular stem 210 of the retainer body 155d prior to insertion into the outer tube 136 of the damper 112. Through use of the retainer ring 211, the adapter body 130 and the first and second intake valve bodies 155a, 155b can be pre-assembled on the tubular stem 210 of the retainer body 155d such that there is a pre-load on the first and second spring disc stacks 167a, 167b without the pre-load driving the components of the pre-assembly apart. However, it should be appreciated that the retainer ring 211 could be eliminated and the tubular stem 210 of the retainer body 155d could be hammered or otherwise manipulated to produce an outwardly flared, mechanically deformed end to hold the components of the pre-assembly together before the pre-assembly is inserted into the outer tube 136 of the damper 112. Either way, manufacturing and assembly of the damper 112 is less complicated, more efficient, and more economical because both the intake valve assembly 154 and the accumulator insert 160 can be pre-assembled prior to installation inside the outer tube 136.

The first intake valve 165a controls fluid flow through the first set of intake orifices 158b between the first intermediate chamber 159a and the fluid transport chamber 138. In the illustrated example, the first intake valve 165a is a passive valve. More specifically, in the illustrated embodiment, the first intake valve 165a includes a first spring disc stack 167a that is retained between the adapter body 130 and the first intake valve body 155a. In operation, the first spring disc stack 167a opens and closes the first set of intake orifices 158b by flexing towards and away from the first intake valve body 155a based on a pressure differential between the first intermediate chamber 159a and the fluid transport chamber 138. As a result, the first intake valve 165a acts as a one-way valve that permits fluid flow in only one direction from the first intermediate chamber 159a to the fluid transport chamber 138. This one-way flow through the first intake valve 165a occurs during compression strokes as the piston 124 moves toward the intake valve assembly 154.

The second intake valve 165b controls fluid flow through the second set of intake orifices 158d between the first and second intermediate chambers 159a, 159b. In the illustrated example, the second intake valve 165b is a passive valve. More specifically, in the illustrated embodiment, the second intake valve 165b includes a second spring disc stack 167b that is retained between the second intake valve body 155b and the retainer body 155d. In operation, the second spring disc stack 167b opens and closes the second set of intake orifices 158d by flexing towards and away from the second intake valve body 155b based on a pressure differential between the first intermediate chamber 159a and the second intermediate chamber 159b. The second intake valve 165b acts as a one-way valve that permits fluid flow in only one direction from the first intermediate chamber 159a and the second intermediate chamber 159b. This one-way flow through the second intake valve 165b occurs during extension strokes as the piston 124 moves away from the intake valve assembly 154. The retainer body 155d includes a plurality of teeth 208 that are arranged to abut the divider body 155c. The plurality of teeth 208 are circumferentially spaced to define the plurality of channels 204 in the retainer body 155d. The channels 204 in the retainer body 155d extend radially outwardly away from the central longitudinal axis A and therefore permit fluid flow between the second intermediate chamber 159b and the intermediate passageway 158a.

The rebound and compression dampening rates of the damper 112 can be dynamically controlled and adjusted between soft and firm limits by applying electric current to the externally mounted, electromechanical control valves 164a, 164b. However, a mutual relationship/correlation exists between the soft and firm limits due to fluid flow rate limitations through the damper 112 and the control valves 164a, 164b, meaning that internal pressures inside the rebound and compression chambers 126, 128 can sometimes exceed design limits when the dampening rates of the damper 112 are near or at the firm/upper limit of the adjustable dampening rate range. The rebound chamber and compression chamber pressure relief valves 300, 302 described herein release excess pressure in the rebound and compression chambers 126, 128 such that the fluid pressure does not exceed design limits, improving safety, durability, and performance, without the trade-off of consuming extra space/dead length inside the damper 112 that would either reduce the available travel distance of the damper 112 or increase its overall length OL. In other words, the rebound chamber and compression chamber pressure relief valves 300, 302 described herein are particularly advantageous in that they minimize the extra dead length typically associated with internal pressure relief (i.e., blow-off) valves.

While aspects of the present disclosure have been particularly shown and described with reference to the embodiments above, it will be understood by those skilled in the art that various additional embodiments may be contemplated by the modification of the disclosed dampers without departing from the spirit and scope of what is disclosed. Such embodiments should be understood to fall within the scope of the present disclosure as determined based upon the claims and any equivalents thereof.

What is claimed is:

1. A damper comprising:
   a pressure tube extending co-axially about a longitudinal axis and longitudinally between a first pressure tube end and a second pressure tube end;
   a piston slidably disposed within the pressure tube defining a rebound chamber and a compression chamber;
   a piston rod extending co-axially with the longitudinal axis that is fixedly coupled to the piston;
   an outer tube disposed around the pressure tube to define a fluid transport chamber between the pressure tube and the outer tube, the outer tube extending longitudinally between a first outer tube end and a second outer tube end;
   an intake valve assembly positioned at the second pressure tube end;
   an accumulation chamber positioned longitudinally between the intake valve assembly and the second outer tube end;
   an intermediate chamber defined by the intake valve assembly at a position between the compression chamber and the accumulation chamber;
   an intermediate passageway in the intake valve assembly that is disposed in fluid communication with the intermediate chamber and the compression chamber;
   at least one control valve externally mounted to the outer tube, the at least one control valve having a control valve inlet that is arranged in fluid communication with the intermediate chamber and a control valve outlet that is arranged in fluid communication with the fluid transport chamber and the accumulation chamber;
   at least one rebound chamber pressure relief passageway that extends through the piston from the rebound chamber to the compression chamber;
   a rebound chamber pressure relief valve that is configured to permit fluid flow through the at least one rebound chamber pressure relief passageway in one direction from the rebound chamber to the compression chamber when fluid pressure in the rebound chamber exceeds a blow-off pressure threshold of the rebound chamber pressure relief valve;
   at least one compression chamber pressure relief passageway that extends through the intake valve assembly between the intermediate passageway and the accumulation chamber; and
   a compression chamber pressure relief valve that is configured to permit fluid flow through the at least one compression chamber pressure relief passageway in one direction from the intermediate passageway to the accumulation chamber when fluid pressure in the compression chamber exceeds a blow-off pressure threshold of the compression chamber pressure relief valve.

2. The damper of claim 1, wherein the rebound chamber pressure relief valve and the compression chamber pressure relief valve each includes a spring-biased plunger that extends longitudinally between a first plunger end and a second plunger end and a valve head that is fixedly coupled to the second plunger end and is longitudinally moveable with the plunger between a closed position where each valve head is positioned to obstruct fluid flow through the at least one rebound chamber pressure relief passageway and the at least one compression chamber pressure relief passageway and an open position where each valve head is positioned to permit fluid flow through the at least one rebound chamber pressure relief passageway and the at least one compression chamber pressure relief passageway.

3. The damper of claim 2, further comprising:
   a collector chamber positioned outside of the outer tube and arranged in open fluid communication with the accumulation chamber.

4. The damper of claim 3, wherein the at least one intermediate chamber includes first and second intermediate chambers defined by the intake valve assembly and the at least one control valve includes first and second control valves that are externally mounted to the outer tube, wherein the first control valve has a first control valve inlet that is arranged in fluid communication with the fluid transport chamber and a first control valve outlet that is arranged in fluid communication with the collector chamber, wherein the second control valve having a second control valve inlet that is arranged in fluid communication with the second intermediate chamber and a second control valve outlet that is arranged in fluid communication with the collector chamber, and wherein the first intermediate chamber is arranged in open fluid communication with the collector chamber.

5. A damper comprising:
   a pressure tube extending co-axially about a longitudinal axis and longitudinally between a first pressure tube end and a second pressure tube end;
   a piston slidably disposed within the pressure tube defining a rebound chamber and a compression chamber, the piston extending longitudinally between a first piston end that faces the rebound chamber and a second piston end that faces the compression chamber;
   a piston rod extending co-axially about the longitudinal axis and longitudinally between a first piston rod end and a second piston rod end, the second piston rod end being fixedly coupled to the piston; and
   a rebound chamber pressure relief valve comprising at least one rebound chamber pressure relief passageway that extends through the piston from the first piston end to the second piston end, a plunger bore that extends longitudinally within the second piston rod end, a plunger extending longitudinally between a first plunger end that is slidably received in the plunger bore and a second plunger end that extends out from the plunger bore into the compression chamber, a valve head that is fixedly coupled to the second plunger end, and a spring positioned in the plunger bore that biases the plunger towards the first piston rod end such that the plunger pulls the valve head against the second piston end to obstruct fluid flow through the at least one rebound chamber pressure relief passageway in a rebound chamber pressure relief valve closed position.

6. The damper of claim 5, wherein the spring of the rebound chamber pressure relief valve applies a biasing force to the plunger that defines a blow-off pressure threshold of the rebound chamber pressure relief valve and wherein the plunger and valve head are configured to slide longitudinally where the valve head is configured to move away from the second piston end and permit fluid flow through the at least one rebound chamber pressure relief passageway in a rebound chamber pressure relief valve open position when fluid pressure in the rebound chamber exceeds the blow-off pressure threshold of the rebound chamber pressure relief valve.

7. The damper of claim 6, wherein the plunger includes a first spring seat that extends radially out from the first plunger end, the piston includes a second spring seat, and the spring is a coil-spring that extends helically about the plunger between the first and second spring seats.

8. The damper of claim 6, wherein the at least one rebound chamber pressure relief passageway extends between a first rebound passageway opening on the first piston end and a second rebound passageway opening on the second piston end, wherein the first rebound passageway opening is open to the rebound chamber, and wherein the second rebound passageway is open and closed by longitudinal movement of the valve head into and out of contact with the second piston end.

9. The damper of claim 5, wherein the at least one rebound chamber pressure relief passageway is a plurality of rebound chamber pressure relief passageways that extend through the piston at circumferentially spaced locations and wherein the valve head is provided in the form of a sealing disc that has a flat, disc-like shape.

10. The damper of claim 5, wherein the second piston rod end does not extend longitudinally beyond the second piston end into the compression chamber.

11. A damper comprising:
a pressure tube extending co-axially about the longitudinal axis and longitudinally between a first pressure tube end and a second pressure tube end;
a piston slidably disposed within the pressure tube defining a rebound chamber and a compression chamber;
an outer tube disposed around the pressure tube to define a fluid transport chamber between the pressure tube and the outer tube, the outer tube extending longitudinally between a first outer tube end and a second outer tube end;
an intake valve assembly positioned within the outer tube and extending longitudinally between a first intake valve assembly end and a second intake valve assembly end, the intake valve assembly including at least one intermediate chamber disposed in fluid communication with the compression chamber via an intermediate passageway extending within the intake valve assembly;
an accumulation chamber positioned longitudinally between the intake valve assembly and the second outer tube end; and
a compression chamber pressure relief valve comprising at least one compression chamber pressure relief passageway that extends through the intake valve assembly between the intermediate passageway and the accumulation chamber, a plunger cavity that extends longitudinally within the intake valve assembly, a plunger extending longitudinally between a first plunger end that is slidably received in the plunger cavity and a second plunger end that extends out from the plunger cavity into the accumulation chamber, a valve head that is fixedly coupled to the second plunger end, and a spring positioned in the plunger cavity that biases the plunger away from the second outer tube end such that the plunger pulls the valve head against the second intake valve assembly end to obstruct fluid flow through the at least one compression chamber pressure relief passageway in a compression chamber pressure relief valve closed position.

12. The damper of claim 11, wherein the spring of the compression chamber pressure relief valve applies a biasing force to the plunger that defines a blow-off pressure threshold of the compression chamber pressure relief valve and wherein the plunger and valve head are configured to slide longitudinally where the valve head is configured to move away from the second piston end and permit fluid flow through the at least one compression chamber pressure relief passageway in a compression chamber pressure relief valve open position when fluid pressure in the compression chamber exceeds the blow-off pressure threshold of the compression chamber pressure relief valve.

13. The damper of claim 12, wherein the intermediate passageway in the intake valve assembly extends co-axially with the longitudinal axis and wherein the compression chamber pressure relief valve includes a plunger housing that extends longitudinally within the intermediate passageway and defines the plunger cavity therein.

14. The damper of claim 13, wherein the intake valve assembly includes an adapter body at the first intake valve assembly end that abuts the second pressure tube end, a divider body at the second intake valve assembly end, and at least one intake valve body positioned longitudinally between the adapter body and the divider body, wherein the divider body and the at least one intake valve body abut an inside cylindrical surface of the outer tube, and wherein the at least one intake valve body includes an intake valve that controls fluid flow through at least one intake orifice in the at least one intake valve body.

15. The damper of claim 14, wherein the intake valve assembly includes a retainer body positioned between the divider body and the at least one intake valve body and wherein the retainer body includes a tubular stem that extends longitudinally through the at least one intake valve body and the adapter body to define the intermediate passageway therein.

16. The damper of claim 15, wherein the retainer body includes a plurality of teeth that abut the divider body and that are circumferentially spaced to define a plurality of radially extending channels in the retainer body that permit fluid flow between the intermediate passage and the at least one intermediate chamber.

17. The damper of claim 14, wherein the at least one compression chamber pressure relief passageway extends through the divider body of the intake valve assembly between a first compression passageway opening on the divider body and a second compression passageway opening on the divider body at the second intake valve assembly end, wherein the first compression passageway opening is open to the intermediate passageway or the at least one intermediate chamber, and wherein the second compression passageway is open and closed by longitudinal movement of the valve head into and out of contact with the divider body at the second intake valve assembly end.

18. The damper of claim 14, wherein the at least one compression chamber pressure relief passageway is a plurality of compression chamber pressure relief passageways that extend through the divider body at circumferentially spaced locations and wherein the valve head is provided in the form of a sealing disc that has a flat, disc-like shape.

19. The damper of claim 14, wherein the plunger includes a first spring seat that extends radially out from the first plunger end, the divider body includes a second spring seat, and the spring is a coil-spring that extends helically about the plunger between the first and second spring seats.

20. The damper of claim 14, wherein the at least one intake valve body of the intake valve assembly includes a first intake valve body adjacent to the adapter body and a second intake valve body adjacent to the divider body, wherein the at least one intermediate chamber includes a first intermediate chamber positioned longitudinally between the first and second intake valve bodies and a second intermediate chamber positioned longitudinally between the second intake valve body and the divider body, wherein the first intake valve body supports a first intake valve that permits one-way fluid flow through a first set of intake orifices in the first intake valve body from the first intermediate chamber to the fluid transport chamber, and wherein the second intake valve body supports a second intake valve that permits one-way fluid flow through a second set of intake orifices in the second intake valve body from the first intermediate chamber to the second intermediate chamber.

* * * * *